United States Patent Office 2,807,278
Patented Sept. 24, 1957

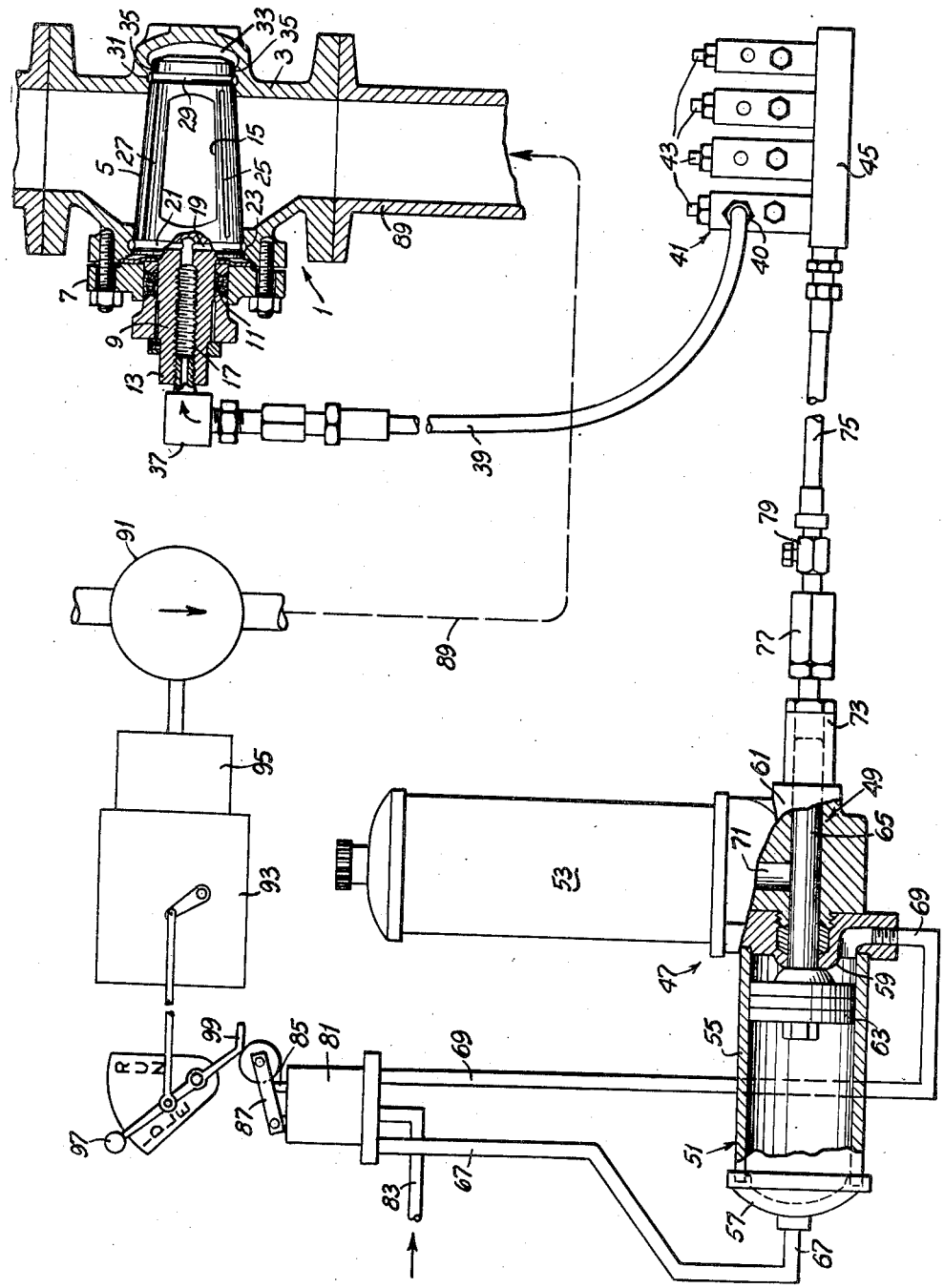

2,807,278

VALVES

Owen L. Bandy, St. Louis, Mo., assignor to The McNeil Machine & Engineering Company, Akron, Ohio, a corporation of Ohio Application August 2, 1956, Serial No. 601,690

10 Claims. (Cl. 137—246.22)

This invention relates to valve actuation and lubrication systems, and more particularly to such systems for actuating and lubricating plug valves.

The invention is specially concerned with the actuation and lubrication of a valve, more particularly a plug valve, adapted to receive fluid under pressure for valve unseating purposes to allow the valve to be more readily operated. Among the several objects of the invention may be noted the provision of a system for automatically supplying fluid under pressure to such a valve for unseating purposes whenever there is a decrease in pressure in the line in which the valve is connected, so that the valve may be unseated for easier operation thereof simply by the act of dropping pressure in the line; the provision of such a system in which a lubricant is used as the pressure fluid for unseating purposes so that the valve is lubricated simultaneously with unseating; and the provision of a system having the stated features which is economical to provide and reliable in operation. Other objects and features will be in part apparent and in part pointed out hereinafter.

The invention accordingly comprises the constructions hereinafter described, the scope of the invention being indicated in the following claims.

In the accompanying drawing, in which one of various possible embodiments of the invention is illustrated, the single figure is a diagrammatic view of a system of this invention, with a plug valve shown wholly in cross section, and a lubricant pumping unit shown partly in cross section.

Referring to the drawing, there is indicated at 1 a plug valve of a well-known conventional type having a body 3, a tapered plug 5, and a retainer 7 for the plug. The plug has a stem 9 extending out through the retainer 7, packing for the stem being indicated at 11. The stem usually has a square outer end portion 13 for application of a wrench for turning the plug. The plug has a port 15. In the stem is a screw-threaded bore 17 which leads to a transverse passage 19 extending across the larger end of the tapered plug. The passage 19 communicates at its ends with an annular groove 21 in the plug. Groove 21 mates with an annular groove 23 in the valve body 3. The plug has lengthwise grooves in its periphery such as indicated at 25 and 27. Grooves such as indicated at 25 are closed-end grooves. Grooves such as indicated at 27 extend from groove 21 to an annular groove 29 adjacent the small end of the tapered plug. Groove 29 mates with an annular groove 31 in the valve body 3. The valve body is formed to provide a well 33 between the small end of the plug and the valve body. Grooves such as indicated at 35 are provided in the plug leading from groove 29 to the well 33.

A valve such as above described conventionally has a screw (not shown) threaded in the bore 17, and conventionally contains lubricant in the bore 17, passage 19, grooves 21, 23, 25, 27, 29, 31, 35 and the well 33.

It will be understood by those versed in the art that unseating of the plug is obtained by turning this screw to compress the lubricant, whereupon the pressure of the lubricant in the well 33, applied over the area of the small end of the plug, slightly raises the plug from its seat. This overcomes sticking of the plug and provides for better lubrication so that the plug may be readily turned. In accordance with this invention, however, the screw conventionally used in the bore 17 is removed, and a check valve fitting 37 is screwed into the outer end of the bore 17. A hose line 39 leading from the outlet 40 of a lubricant injector 41 is connected to the fitting 37 to supply lubricant under pressure to the plug valve for purposes of lubricating the plug valve and unseating its plug. The check valve in fitting 37 is adapted to open in the direction of the arrow shown in the drawing for supplying lubricant under pressure to the plug valve.

The injector 41 is of a type which receives lubricant from a lubricant line, which operates in response to development of a predetermined injector-cycling pressure in the lubricant line to inject a measured charge of lubricant, and which resets and reloads with another measured charge of lubricant upon relief of pressure in the lubricant line subsequent to injection. Injectors of this type are well known in the art and require no further description, their detailed construction not being material to this disclosure. Disclosures of injectors of this type will be found in such U. S. Patents as 2,122,177, 2,141,022, 2,155,250, 2,283,638, 2,448,583, 2,627,320 and 2,637,413. The injector 40 is shown as one of a series of similar injectors 43 connected into a manifold 45 for receiving lubricant from the manifold through the injector inlet, these other injectors being used for lubricating other parts (not shown).

The manifold 45 is shown as adapted to be supplied with lubricant under pressure by a lubricant pumping unit generally designated 47. This comprises an expansible-chamber lubricant pump 49, an expansible-chamber air motor 51 for operating the pump, and a lubricant reservoir 53. The motor 51 comprises a cylinder 55 having rearward and forward end heads 57 and 59. The pump comprises a cylinder 61 which extends forward from end head 59. Working in the motor cylinder is a piston 63. A pump plunger 65 extends forward from the piston 63 into the pump cylinder 61. Air lines 67 and 69 are connected to motor cylinder through the rearward and forward end heads 57 and 59, respectively. The pump cylinder 61 has an inlet 71 from the reservoir. When the motor piston 63 is moved to the rearward (left) end of the motor cylinder, the pump plunger 65 moves to a retracted, charging position in which inlet 71 is open to the pump cylinder. The pump plunger 65 closes the inlet 71 as it moves forward (toward the right) through a pressure or power stroke from its retracted position to its forward position shown in the drawing.

The outlet 73 of pump cylinder 61 is connected to the manifold 45 by means of a line 75 which may include a check valve 77 and a safety valve 79. Check valve 77 is a compound valve adapted to open for flow of lubricant from the pump to the manifold upon a pressure stroke of the pump plunger and to allow for venting of lubricant back through the line upon a return stroke of the pump plunger to relieve pressure in the manifold for purposes of permitting the injectors 41 and 43 to reload and reset, while avoiding loss of prime in the manifold and in the portion of line 75 between the check valve 77 and the manifold. This allows for single-stroke operation of the pump 49 to operate the injectors. Check valve 77 may be of a type such as shown in U. S.

Patent 2,657,763 or any other suitable type. Safety valve 79 relieves excessive pressure in the line 75.

Air under pressure is supplied to or vented from the ends of motor cylinder 55 through the lines 67 and 69 under the control of a four-way valve 81. Compressed air is supplied to the valve 81 via an air line 83. Valve 81 has an operating rod 85 and an operating lever 87. With the lever 87 in the raised position shown in the drawing, the valve 81 is set to supply air to the rearward (left) end of the motor cylinder 55 via air line 67 and to vent the forward (right) end of the motor cylinder via air line 69. When the lever 87 is moved down, the valve is set to supply air to the forward (right) end of the motor cylinder via line 69 and to vent the rearward (left) end of the motor cylinder via line 67. Accordingly, when the lever 87 is in the raised position, the valve 81 is set in a power stroke position as regards unit 47, and when the lever 87 is moved down, the valve 81 is set in a return stroke position as regards unit 47.

The plug valve 1 is shown as connected in a line 89 through which a material (such as well drilling mud, for example) is adapted to be pumped under pressure by a pump 91. Pump 91 is adapted to be driven by an internal combustion engine 93 through a torque converter 95. Operation of the engine is controlled by the usual throttle control comprising a lever 97, movable between "Idle" and "Run" positions. When the throttle lever is in the "Idle" position, the pump 91 does not develop pressure in line 89. When the throttle lever is moved to the "Run" position, the pump 91 is driven to develop pressure in line 89. When the throttle lever is returned from the "Run" to the "Idle" position, the pressure in line 89 drops. The throttle lever 97 has an extension 99 engageable with the operating lever 87 of valve 81, the arrangement being such that when the throttle lever is in the "Idle" position, the valve 81 is set in its power stroke position, and when the throttle lever is in the "Run" position, the valve 81 is set in its return stroke position.

Operation is as follows:

As shown in the drawing, the throttle lever 97 is in the "Idle" position. Valve 81, accordingly, is shown in its power stroke position and the motor piston 63 is shown in its forward position. Upon movement of the throttle lever 97 to the "Run" position, the valve 81 is set in the return stroke position. Compressed air is thereupon supplied through line 69 to the forward end of the motor cylinder 55, and air is vented through line 67 from the rearward end of the motor cylinder. The motor piston 63 is moved to the rearward (left) end of cylinder 55, and the pump plunger 65 is moved to its retracted position wherein inlet 71 is open to the pump cylinder 61. Upon this return movement of the pump plunger, the manifold 45 and line 75 are vented of pressure to allow the injector 41 to reset and reload.

When the throttle lever 97 is returned to the "Idle" position, the valve 81 is set in its power stroke position. Compressed air is thereupon supplied through line 67 to the rearward end of the motor cylinder 55, and air is vented through line 69 from the forward end of the motor cylinder. The motor piston 63 thereupon moves forward and drives the pump plunger 65 forward through a pressure stroke to develop pressure in line 75 and in the manifold 45. This operates the injector 41 to deliver a measured charge of lubricant under pressure through line 39 to the plug valve 1. This unseats the plug 5 and lubricates the valve 1.

The motor piston 63 and pump plunger 65 remain in the forward position shown in the drawing as long as the throttle lever 97 remains in the "Idle" position. Then, the next time the throttle lever 97 is moved to the "Run" position, the piston 63 and plunger 65 are moved through a return stroke to their retracted position to provide for resetting and reloading of the injector 41.

From the above, it will be clear that each time the throttle lever 97 (which constitutes in conjunction with the engine 93, torque converter 95 and pump 91 a means for controlling the pressure in line 89) is moved from the "Run" position to the "Idle" position to drop the pressure in line 89, the plug valve 1 receives a measured charge of lubricant from the injector 41. This charge accomplishes two functions, the first being the unseating of the plug 5, and the second being the correct lubrication of the valve (correct because the charge, delivered by the injector 41, is an accurately metered charge). The plug 5 is held unseated during the time the throttle lever is in the "Idle" position, and this makes it easy to turn the plug valve stem 9. Hose line 39 is flexible to permit turning of the valve stem. Each time the throttle lever 97 is moved to the "Run" position, the lubricant pressure in the plug valve is automatically relieved, so that the plug 5 reseats.

It will be understood that the principles of the invention are applicable to a system for unseating the plug 5 only, without the additional effect of lubrication. For example, the plug valve 1 may be supplied with fluid under pressure other than a lubricant for unseating purposes only. Basically, the invention involves the provision of means (herein shown to comprise the pumping unit 49, injector 41, and valve 81) operable upon actuation of the means (herein shown to comprise the throttle lever 97, engine 93, torque converter 95 and pump 91) for controlling the pressure in the line 89 to decrease the pressure in the line 89, for supplying fluid under pressure to the valve 1 for unseating purposes.

In view of the above, it will be seen that the several objects of the invention are achieved and other advantageous results attained.

As various changes could be made in the above constructions without departing from the scope of the invention, it is intended that all matter contained in the above description or shown in the accompanying drawing shall be interpreted as illustrative and not in a limiting sense.

I claim:

1. In a system comprising a valve connected in a line, said valve being adapted to receive fluid under pressure for unseating purposes, means for controlling the pressure in the line, and means operable upon actuation of said controlling means to decrease the pressure in said line for supplying fluid under pressure to the valve for unseating purposes.

2. In a system comprising a valve connected in a line, said valve being adapted to receive fluid under pressure for unseating purposes, means for controlling the pressure in the line, means for supplying fluid under pressure to the valve for unseating purposes comprising a pump, and means operable upon actuation of said controlling means to decrease the pressure in said line for operating the pump to supply fluid under pressure to the valve.

3. In a system comprising a valve connected in a line, said valve being adapted to receive lubricant under pressure for lubricating and unseating purposes, means for controlling the pressure in the line, a lubricant injector having an inlet and an outlet, the outlet being connected to the valve, a lubricant pump having its outlet connected to the injector inlet, and means operable upon actuation of said controlling means to decrease the pressure in said line for operating the pump to supply lubricant under pressure to the injector and from the injector to the valve.

4. In a system comprising a plug valve connected in a line, said plug valve being adapted to receive fluid under pressure for unseating the plug thereof, said system having a pump for pumping a material under pressure through the line, means for driving the pump, a control for the driving means movable between a position for driving the pump to develop pressure and a position wherein the pump does not develop pressure, and means operable upon actuation of said control to the latter position for supplying fluid under pressure to the valve for unseating the plug.

5. In a system comprising a plug valve connected in a line, said plug valve being adapted to receive fluid under pressure for unseating the plug thereof, said system having a pump for pumping a material under pressure through the line, means for driving said pump, a control for the driving means movable between a position for driving said pump to develop pressure and a position wherein said pump does not develop pressure, means for supplying fluid under pressure to the valve for unseating the plug comprising a pump for said fluid, and means operable upon actuation of said control to the last-named position for operating said fluid pump to supply fluid under pressure to the valve.

6. In a system comprising a plug valve connected in a line, said plug valve being adapted to receive lubricant under pressure for unseating the plug thereof, said system having a pump for pumping a material under pressure through the line, means for driving said pump, a control for the driving means movable between a position for driving said pump to develop pressure and a position wherein said pump does not develop pressure, a lubricant injector having an inlet and an outlet, the outlet being connected to the valve, a lubricant pump having its outlet connected to the injector inlet, and means operable upon actuation of said control to the last-named position for operating the lubricant pump to supply lubricant under pressure to the injector and from the injector to the valve for unseating the plug and lubricating the valve.

7. In a system comprising a plug valve connected in a line, said plug valve being adapted to receive fluid under pressure for unseating the plug thereof, said system having a pump for pumping a material under pressure through the line, means for driving the pump comprising an internal combustion engine and a throttle control for said engine, said throttle control being movable between an "Idle" and a "Run" position, and means operable upon actuation of said throttle control to the "Idle" position for supplying fluid under pressure to the valve for unseating the plug.

8. In a system comprising a plug valve connected in a line, said plug valve being adapted to receive fluid under pressure for unseating the plug thereof, said system having a pump for pumping a material under pressure through the line, means for driving said pump comprising an internal combustion engine and a throttle control for said engine, said throttle control being movable between an "Idle" and a "Run" position, means for supplying fluid under pressure to the valve for unseating the plug comprising a pump for said fluid, and means operable upon actuation of said throttle control to the "Idle" position for operating said fluid pump to supply fluid under pressure to the valve.

9. In a system comprising a plug valve connected in a line, said plug valve being adapted to receive fluid under pressure for unseating the plug thereof, said system having a pump for pumping a material under pressure through the line, means for driving said pump comprising an internal combustion engine and a throttle control for said engine, said throttle control being movable between an "Idle" and a "Run" position, a lubricant injector having an inlet and an outlet, the outlet being connected to the valve, an expansible-chamber lubricant pump having its outlet connected to the injector inlet, and means operable by said throttle control upon movement thereof to the "Idle" position for operating the lubricant pump through a pressure stroke to supply lubricant under pressure to the injector and from the injector to the valve for unseating the plug and lubricating the valve, and operable by said throttle control upon movement thereof to the "Run" position for operating the lubricant pump through a return stroke.

10. In a system as set forth in claim 9, said means for operating the lubricant pump comprising an expansible-chamber motor, and means for supplying and venting fluid from said motor including a valve, this valve being operable by the throttle control.

No references cited.